United States Patent [19]

Kosugi

[11] Patent Number: 4,705,761
[45] Date of Patent: Nov. 10, 1987

[54] CERAMIC STRUCTURE HAVING THERMAL SHOCK RESISTANCE

[75] Inventor: Tetsuo Kosugi, Toukai, Japan

[73] Assignee: Hitachi, Ltd., Tokyo, Japan

[21] Appl. No.: 718,018

[22] PCT Filed: Jul. 25, 1984

[86] PCT No.: PCT/JP84/00377

§ 371 Date: Mar. 25, 1985

§ 102(e) Date: Mar. 25, 1985

[87] PCT Pub. No.: WO85/00588

PCT Pub. Date: Feb. 14, 1985

[30] Foreign Application Priority Data

Jul. 27, 1983 [JP] Japan .................. 58-135887

[51] Int. Cl.⁴ .................. C04B 35/56; C04B 35/58
[52] U.S. Cl. .................. 501/87; 501/91; 501/92; 501/97; 501/98
[58] Field of Search .................. 501/91, 92, 97, 98, 501/87

[56] References Cited

U.S. PATENT DOCUMENTS

| | | | |
|---|---|---|---|
| 4,104,075 | 8/1978 | Hayashi et al. | 501/92 |
| 4,124,667 | 11/1978 | Coppola | 501/92 |
| 4,135,937 | 1/1979 | Murata et al. | 501/92 |
| 4,135,938 | 1/1979 | Murata et al. | 501/92 |
| 4,327,186 | 4/1982 | Murata et al. | 501/92 |
| 4,332,909 | 6/1982 | Nishida et al. | 501/92 |
| 4,379,852 | 4/1983 | Watanabe et al. | 501/98 |

FOREIGN PATENT DOCUMENTS

| | | | |
|---|---|---|---|
| 56-140076 | 11/1981 | Japan . | |
| 57-27975 | 2/1982 | Japan . | |
| 58-95652 | 6/1983 | Japan . | |
| 59-3072 | 1/1984 | Japan . | |
| 59-3073 | 1/1984 | Japan . | |
| 60-215575 | 4/1984 | Japan | 501/92 |

*Primary Examiner*—Mark L. Bell
*Attorney, Agent, or Firm*—Antonelli, Terry & Wands

[57] ABSTRACT

A ceramic structure whose portion exposed to a heat cycle, as a high-temperature gas turbine blade, a turbo charger or the like, is coated with ceramics having a construction wherein a sinter mainly comprising a boride, nitride or carbide of the element of Group IIIa, IVa, Va or VIa of the Periodic Table and retaining a high strength at a temperature of up to 1,100° C. is dispersed in sintered ceramics comprising at least one of silicon carbide, silicon nitride and sialon as its principal component. A ceramic structure having a thermal shock resistance, high versatility and reliability can be obtained.

7 Claims, 5 Drawing Figures

CERAMIC STRUCTURE HAVING THERMAL SHOCK RESISTANCE

DESCRIPTION

Technical Field

This invention relates to a ceramic structure having a thermal shock resistance, and more particularly to a ceramic structure having a thermal shock resistance which can be appropriately used for turbine blades and the like.

Background Art

The service temperature of a heat engine tends to become higher and higher to further improve the engine efficiency, and constituent members of the heat engine must have higher temperature characteristics. A turbo charger for automobiles, for example, must withstand the use at an exhaust gas temperature ranging from 1,100° to 1,200° C. In a high-temperature gas turbine, the service temperature of from about 1,300° to about 1,500° C. is planned as the gas temperature. To accomplish these objects, ceramic materials, such as silicon carbide, silicon nitride, sialon and the like, which have a high-temperature strength superior to that of metallic materials have been developed. Though these ceramics have sufficient high-temperature characteristics such as high heat resistance and high strength at high temperature, they are so brittle that once cracking takes place, it readily grows to cause the ceramic materials to be easily broken and lack reliability. Moreover, the strength is likely to vary due to internal defects of sinters or their surface defects and, therefore, strength design of the ceramic materials as a structural material is extremely difficult.

On the contrary, tool materials such as sinters mainly comprising cermet, boron carbide, boron nitride or the like, i.e. so-called "high tenacity materials", are so tough that cracking is difficult to grow even when it takes place. However, these materials have disadvantages in that their properties change and mechanical strength drops remarkably when they are exposed to a high temperature in an oxidizing atmosphere.

In order to eliminate these disadvantages, a method has been proposed, for example, wherein fibers having a high heat resistance and a high strength at high temperature, such as silicon carbide, is mixed into a heat-resistant material such as silicon nitride, and the mixture is sintered.

However, versatility and reliability of such a material as a structural material are not yet sufficiently high for the following reasons.

1. Generally, fibers are expensive.
2. Since an aspect ratio is as large as at least about 50, fibers entangle mutually and are difficult to disperse, so that a uniform sinter can not be obtained easily.
3. Since fibers do not shrink in sintering, a specific sintering method such as a hot press process must be employed in order to obtain a compact sinter devoid of any cracks, and this results in still another problem that the mass-productivity is low and the application of this method to articles having complicated shapes is difficult.
4. Fibers are highly likely to be arranged in parallel with one another during the molding and sintering processes, so that the mechanical properties of the resulting sinter will have anisotropy. This makes it difficult to use the sinter as a general structural material.

DISCLOSURE OF THE INVENTION

An object of the present invention is to provide a structure having a thermal shock resistance which is suitable for use as high-temperature members such as a turbo charger or a gas turbine and in which a structural ceramic member having high reliability and versatility is employed.

The present invention is characterized in that a portion exposed to a heat cycle with the highest service temperature of at least 1,100° C. is composed of ceramics having the following features:

(1) fine particles which are more brittle than the a sintered ceramic are dispersed in the body;
(2) the material has bending strength of at least 30 kg/mm$^2$ at the highest service temperature and breaking tenacity of at least 10 MN/m$^{3/2}$ in terms of $K_{1c}$; and/or
(3) the material has a composite structure such that cracks that develop therein are entrapped inside the particles and are bent or branched.

The present invention can be typically applied to structures such as turbines or turbo chargers, rotary members (rotary structural members) and/or those structures which are exposed to combustion gas, explosion gas, and the like.

The requirement of the item (2) described above, i.e., breaking tenacity of at least 10 MN/m$^{3/2}$, is based upon the tolerance of strength design of the rotary structures. $Si_3N_4$ ceramics that have been known to this date have breaking tenacity of at most 8 MN/m$^{3/2}$. The heat resistance is prescribed to be at least 30 kg/mm$^2$ for the following reason. So-called "defects" or "flaws" including cracks are easy to develop inside and/or on the surface of the ceramics and the strength drops. The inspection (ultrasonic flaw detection) cannot detect but a flaw of about 100 μm or larger. If $K_{1c}$ is at least 10 MN/m$^{3/2}$, a strength of at least 30 kg/mm$^2$ can be maintained for flows having such a size. The existing ceramics have a possibility of breaking even if they pass the inspection. Therefore, their reliability is low. Since none of the heretofore known composite ceramics have $K_{1c}$ of at least 10 MN/m$^{3/2}$ at 1,100° C., the materials might crack unless they have a bending strength of at least 30 kg/mm$^2$.

The structural ceramic members that can be used in the present invention comprise a silicon sinter having a heat resistance which ensures a high strength of at least about 30 kg/mm$^2$ at preferably at least 1,100° C. and a high tenacity expressed by a breaking tenacity of at least 10 MN/m$^{3/2}$ in terms of $K_{1c}$, and having substantially isotropic mechanical properties.

The silicon ceramics that can be used in the present invention have a structure wherein a sinter mainly comprising a boride, nitride or carbide of the elements of Group IIIa, IVa, Va or VIa of the Periodic Table and retaining its high strength up to 1,100° C. is dispersed in a sinter mainly comprising at least one member of silicon carbide, silicon nitride and sialon, and particularly preferably, the aspect ratio of the consituent particles of the sinter is up to 10.

As a result of intensive studies, the inventors of the present invention have reached the following conclusion in order to use the ceramics for turbo chargers of automobiles, rotors of high-temperature gas turbines, and the like.

(1) Only such a heat resistance is necessary that ensures a sufficient mechanical strength at a temperature of at least 1,100° C. More particularly, a strength of at least about 30 kg/mm² at 1;100° C. or above must be secured.

(2) To use the ceramics at high temperatures in an oxidizing atmosphere, it is necessary to use a silicon sinter mainly comprising silicon carbide, silicon nitride, sialon or the like so that the change of properties inside the ceramics can be prevented by an oxide film formed on the surface at the high temperature.

(3) Machine work after sintering is indispensable in order to obtain ceramics having complicated shapes such as components of turbo chargers, high-temperature gas turbines, and the like. Surface flaws having a maximum size of about 100 to about 200 μm often develop in this case, so that the strength of conventional ceramics drops, causing the drop of reliability. If ceramics having a breaking tenacity of at least 10 MN/m$^{3/2}$ is used, however, a strength of at least about 30 kgf/mm² can be exhibited under such a condition, and the reliability of ceramic components can be drastically improved.

(4) If ceramics having substantially isotropic mechanical properties are used, heat deformation occurs isotropically with the temperature change, and anisotropic deformation such as eccentricity does not occur against thermal stress or applied stress. Therefore, they have a high stability when used as rotary members such as rotors, and the reliability of a joint or a fitting portion with metals or with other ceramics is high. Since strength design of the structural components can be made easily and with a high level of accuracy, the reliability of the structural components is high. The ceramic materials can be easily applied to molding and working of components having complicated shapes or to those components to which three-dimensional stress is applied. The ceramic materials have high versatility as structural materials.

The large breaking tenacity and high heat resistance described above can be accomplished by the use of ceramics having a structure in which a sinter mainly comprising a boride, nitride or carbide of the element of Group IIIa, IVa, Va or VIa is dispersed as an inorganic matter retaining its high strength up to 1,100° C. in silicon ceramics such as silicon carbide, silicon nitride or sialon. More particularly, those ceramics can be used in which a sinter mainly comprising YC, TiB$_2$, HfB$_2$, HfC, VC, VN, NbB$_2$, NbN, TaB$_2$, WB$_2$, or the like, is dispersed.

Silicon carbide is used most preferably as the matrix silicon ceramics. If silicon carbide is used, no vitreous deposition phase occurs at the grain boundray unlike silicon nitride and sialon, so that the following characteristics can be observed.

(1) The high strength can be retained at high temperatures of about 1,600° C.
(2) The oxidation resistance at high temperatures is particularly great.
(3) As a result, the structural component comprising the resulting ceramics can be used stably for a long period at high temperatures of from about 1,300° to about 1,500° C.

Therefore, the structural component of the present invention wherein silicon carbide is used as the matrix exhibits a high reliability when used as a component which rotates at a high speed in an atmosphere of a gas temperature of about 1,500° C., such as blades of a high-temperature gas tubine, or as a component which is used under high-temperature, high-speed conditions, such as a turbo charger rotor of a sports car.

When silicon nitride or sialon is used as the silicon matrix, the sintering temperature needs be from about 1,700° to about 1,850° C., while when silicon carbide is used, the sintering temperature must be raised to at least 1,900° C. If the sintering temperature is lower than this level, the sinterability of ceramics will drop and open voids will remain inside them, thereby causing the following problems.

(1) The strength of the resulting ceramics will drop.
(2) Since external air enters inside the ceramics through the open voids, a sinter mainly comprising a boride, nitride or carbide of the element of Group IIIa, IVa, Va or VIa of the Periodic Table, which has a lower oxidation resistance then the matrix, will be readily oxidized, so that the ceramics will be decomposed during use at high temperatures, and the strength and breaking tenacity will drop remarkably.

Therefore, the object of the present invention can not be accomplished in such a case.

It is necessary for the ceramics of the present invention that the boride, nitride or carbide of the element of Group IIIa, IVa, Va or VIa of the Periodic Table be coated with, and protected by, the silicon ceramic matrix. Unless this structure is realized, that is, if the sintered temperature is so low that open voids remain in the ceramics or if the quantity of the boride, nitride or carbide described is so great that they continue from the surface to the inside of the ceramics, the oxidation resistance at high temperature will drop drastically, and the ceramics can not be applied to the high-temperature structural components as the object of the present invention.

Since the boride, nitride and carbide of the element of Group IIIa, IVa, Va or VIa of the Periodic Table generally have a high sintering temperature, the sintering temperature is preferably as high as possible provided that no decomposition occurs, in order to mix and sinter them with the silicon ceramics as the matrix and to obtain compact and strong ceramics. In this respect, the sintering temperature must not be raised above 1,850° to 1,900° C. for silicon nitride and sialon because they decompose at such a temperature. Since, however, the decomposition temperature of silicon carbide is as high as at least 3,000° C., no problems occur even when the sintering temperature is raised to about 2,000° to about 3,000° C. As a result, when silicon carbide is used as the matrix, ceramics having a high heat resistance, a high strength at high temperature and a high oxidation resistance can be obtained easily.

When a sinter mainly comprising HfB$_2$, NbB$_2$, TaB$_2$, VC, VB$_2$ or W$_2$B is used as the inorganic matter which causes branching the oxidation resistance at high temperature is particularly high, and the sinter reacts with the silicon ceramics as the matrix and with a trace amount of a sintering aid during sintering, thereby forming an aggretate of particles which are below about 1 μm. Moreover, since this particle aggregate has a small Young's modulus, the growing cracks will be branched or bent, thereby improving the breaking tenacity. The amount of the inorganic matter to be dispersed in the silicon ceramics is preferably within the range of 5 to 70 vol % and, more particularly, within the range of 10 to 50 vol %.

If the amount of the inorganic matter is too small, the breaking tenacity can not be improved. More particularly, in order to obtain a breaking tenacity of at least 10 MN/m$^{3/2}$, at least 5 vol % of the inorganic matter must be dispersed, and to obtain a breaking tenacity of at least 15 MN/m$^{3/2}$, the necessary amount is at least 10 vol %. If the amount of the inorganic matter is too great, the high-temperature oxidation resistance generally drops. To use stably the ceramics as a ceramic structural member at 1,100° C. and at 1,300° C., the amount is particularly preferably up to 70 vol % and up to 50 vol %, respectively, If the breaking tenacity of the ceramic structural member is 15 MN/m$^{3/2}$, the energy necessary for breakage is at least twice that necessary if the breaking tenacity is 10 MN/m$^{3/2}$, and the reliability of the sinter when used for a high-speed rotary member, such as a rotor rotating at a speed of at least 300,000 rpm, can be improved drastically.

In the ceramics having a structure in which the sinter mainly comprising the boride, nitride, carbide, etc. is dispersed in the silicon ceramics, cracks are branched or bent due to the interaction between the sinter, that has been dispersed during the growth of cracks, and the cracks, so that the breaking tenacity can be improved. In this instance, the breaking tenacity can be improved more effectively if the Young's modulus of the dispersed sinter is smaller than that of the silicon ceramics as the matrix. For this purpose, it is advisable to use a starting material such as HfB$_2$ which forms a compound having a small Young's modulus by the reaction during sintering. Most preferably, the dispersed sinter has a structure in which about 100 particles of below about 1 μm are aggregated. In this case, cracks are particularly likely to be branched inside the dispersed sinter and are particularly effective in improving the breaking tenacity.

Both of the silicon ceramics as the matrix and the dispersed sinter have preferably an aspect ratio of the constituent particles of up to 10. In such a case, ceramics having isotropic mechanical properties can be easily obtained. If the starting material used has an aspect ratio of at least about 50 or are "fibrous" particles, or if fibrous particles are formed during sintering, adjacent fibrous particles are aligned in the same direction during modling or sintering due to their interaction, and the mechanical properties of the resulting ceramics are difficult to be isotropic, so that the strength will vary according to the direction. Therefore, is a particularly large force acts in a radial direction during rotation of a rotor of a turbo charger, for example, the direction having a high strength must be aligned in the radial direction with the consequence that the production of the structural member becomes difficult or the resulting ceramic member lacks versatility.

On the contrary, since the structural ceramic member of the present invention has a substantially isotropic strength, it can be utilized effectively and easily when a large force acts in the radial direction, such as in the case of a rotor and also when an approximately isotropic force acts, and has high versatility as a structural member.

Up to about 10 wt % of Al$_2$O$_3$, MgO, Y$_2$O$_3$, AlN, B$_4$C or the like may be added as a sintering aid to the ceramic member to be used in the present invention besides the silicon ceramics and the dispersed inorganic matter.

When the ceramic member of the present invention is used in a rotary structure such as a turbine, a turbo charger or the like and/or a structure exposed to combustion/explosion gases, only blades may be composed of the ceramics. In such a case, a shaft will be generally fitted to a metal. The ceramic structure of the present invention can also be applied to a shaft or a burner, and the apparatus such as the turbine or turbo charger may be a whole composed of the ceramic structure of the present invention.

The dispersion of particles need not always be a uniform dispersion of particles, but groups of particles or even the particles and the particle groups in combination may be dispersed. It is, however, preferred that they are dispersed on an average substantially throughout the structure. That is, the properties are preferably isotropic. If the particles are too great, cracks will develop on the particle boundary, while if they are too small, the cracks will detour because of the cleavage of particles or be bent on the particle boundary, so that the branching inside the particles hardly occurs. The present invention may be used in combination with fiber dispersion.

BEST MODE FOR CARRYING OUT THE INVENTION

EXAMPLE 1

Figure 1:
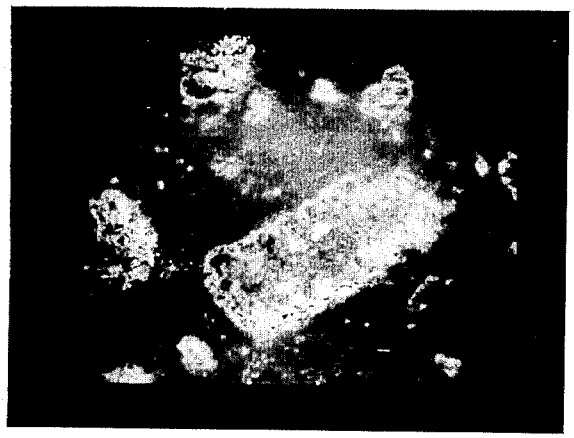
FIGS. 1 through 5 are micrographs showing the results of Vickers indentation test on a ceramic structure having a thermal shock resistance according to the embodiment of the present invention.

Si$_3$N$_4$ powder having an average particle diameter of 0.7 μm and HfB$_2$ (m.p. of 3,250° C.) having an average particle diameter of 2 μm were blended at ratios tabulated in Table 1, and 6 wt % of Y$_2$O$_3$ having an average particle diameter of 0.5 μm and 3 wt % and Al$_2$O$_3$ having an average particle diameter of 0.5 μm were further added to obtain a uniform powder mixture. Furthermore, 10 to 15 wt % of an organic binder such as low-polymerization polyethylene was added to the mixture and the resulting mixture was injection-molded under a load of 1,500 kg/cm$^2$ to obtain molded articles. Each molded article was heated at a rate of 2° C./hr to remove the binder, and was sintered at 1,700° to 1,800° C. in N$_2$ gas to obtain a sinter. The bending strength, breaking tenacity K$_{1c}$ and bending strength at room temperature after oxidation at 1,100° C. for 2,000 hours or at 1,300° C. for 2,000 hours of the resulting sinter are given in Table 1.

Breaking tenacity K$_{1c}$ was measured in accordance with the following formula by giving a scratch having a length C to the sample with a Vickers hardness tester and then measuring bending strength σ:

$$\sigma = \frac{K_{1c}}{\sqrt{\pi c}}$$

TABLE 1

| No. | content (vol %) HfB$_2$ | content (vol %) Si$_3$N$_4$ | bending strength (kg/mm$^2$) room temp. | bending strength (kg/mm$^2$) 1100° C. | bending strength (kg/mm$^2$) 1300° C. | breaking tenacity (MN/m$^{3/2}$) | bending strength after oxidation (kg/mm$^2$) 1100° C. after 2000 h | bending strength after oxidation (kg/mm$^2$) 1300° C. after 2000 h |
|---|---|---|---|---|---|---|---|---|
| 1 | 0 | balance | 65 | 60 | 42 | 5 | 62 | 58 |
| 2 | 2 | " | 65 | 62 | 43 | 6 | 65 | 60 |
| 3 | 5 | " | 63 | 60 | 39 | 10 | 59 | 58 |
| 4 | 10 | " | 57 | 55 | 34 | 15 | 52 | 49 |
| 5 | 20 | " | 52 | 45 | 32 | 17 | 48 | 46 |
| 6 | 50 | " | 50 | 39 | 30 | 16 | 44 | 42 |
| 7 | 70 | " | 45 | 30 | 5 | 15 | 42 | 12 |
| 8 | 90 | " | 12 | 9 | 2 | 8 | — | — |

It can be understood from Table 1 that ceramic members having an excellent breaking tenacity and a high heat resistance can be obtained when the amount of addition of HfB$_2$ is within the range of from 5 to 70 vol %.

As a result of SEM observation of the resulting sinters, it was found that Si$_3$N$_4$ was elliptic with the major axis being from 4 to 10 μm and the minor axis being from 1 to 2 μm (aspect ratio of 2~10), and HfB$_2$ reacted with Y$_2$O$_3$, Al$_2$O$_3$ or the like during sintering and was dispersed in Si$_3$N$_4$ as substantially spherical aggregate of HfB$_2$, HfO$_2$ and HfSi particles. It was also found that the number of particles in the particle aggregate was dependent upon the particle diameter of starting HfB$_2$, the average number of particles were about 10, about 40, and 150 and about 15,000 when the average particle diameter of starting HfB$_2$ was 0.5, 1, 2 and 10 μm, respectively, and the breaking tenacity of the sinters increased to 10, 12, 17 and 18 MN/m$^{3/2}$.

A rotor for a turbo charger (a unitary structure of blades and shaft) having a blade diameter of 40 mm was fabricated tentatively by the method described above using the starting materials having the blend ratios Nos. 3 through 7 of Table 1. A testpiece was cut from a part of each sample rotor for examination. It was found that the bending strength, coefficient of thermal expansion and Young's modulus of the resulting sinter did not depend upon the direction of cutting but were isotropic.

When this rotor was operated continuously for 1,000 hours at a speed of 300,000 rpm at a gas temperature of 1,100° to 1,200° C., no problem such as breakage was found at all.

In the same way, the blades and shaft of the rotor were separately injection-molded and sintered. After the starting powder having the same composition was packed between them, they were coupled by a hot press to obtain a sample rotor. In accordance with this method, the mechanical properties of the sinter obtained by injection molding and sintering were substantially isotropic. Therefore, the reliability of the joint portion of the resulting rotor was extremely high, and the sample rotor did not at all undergo breakage or the like after a continuous rotation test in a gas atmosphere of 1,100° to 1,200° C. and a start/stop repetition test by turning ON and OFF the gas. This suggests that, when combined with the joint method, the structural ceramic member of the present invention can be applied to atricles having complicated shapes that can hardly be produced by ordinary injection molding.

In contrast, SiC fibers of about 0.5 to 1 μmφ by 50 to 1000 μmt were mixed with Si$_3$N$_4$ powder by the conventional method, and the mixture was injection-molded and sintered or was die-molded and hot-pressed to obtain a sample. In this sample, the coefficient of thermal expansion of the sinter varied with the direction of injection molding or hot press, so that two sinters could not be coupled easily unless their directions were aligned. Moreover, the SiC fibers entangled with one another during injection molding, thereby causing clog of the die or hindrance for fluidization during injection molding. As a result, a molding article having a uniform density could not be obtained, cracks were likely to develop in the sample during sintering, and the sintering density could not be raised easily.

Figure 2:
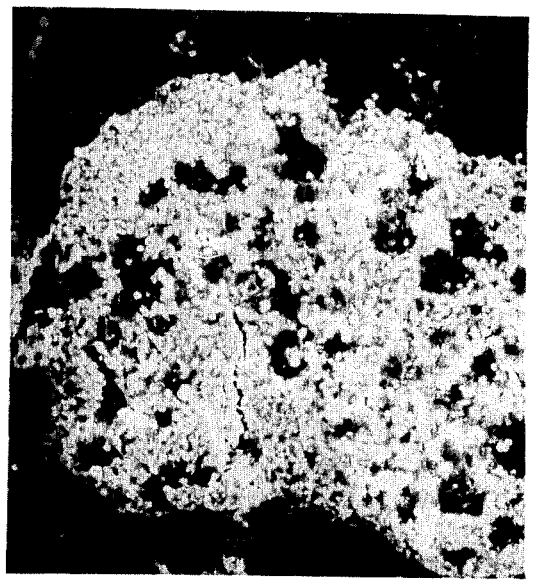
Figure 3:
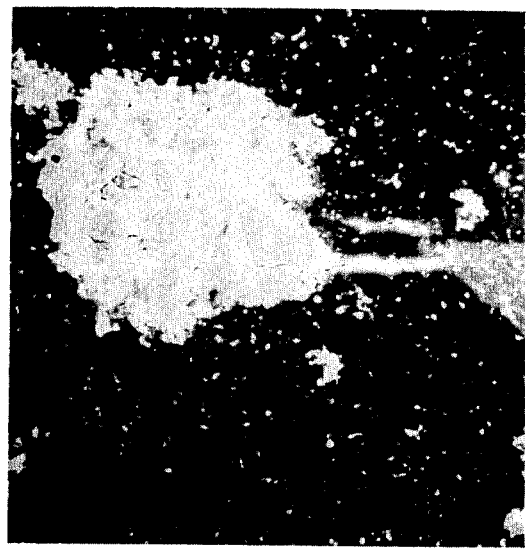

FIG. 1 is a 400X scanning micrograph of the ceramics obtained by adding and dispersing 25 wt % of HfB$_2$ into 75 wt % of a body consisting of 91 wt % of Si$_3$N$_4$, 6 wt % of Y$_2$O$_3$ and 3 wt % of Al$_2$O$_3$, and sintering the mixture at 1,750° C. for 1 hour. The micrograph shows that cracks are bent when a Vickers indenter is indented. FIG. 2 is a scanning micrograph of 2,000X of the sample having the same composition and sintered under the same condition as above. It shows the cracks are branched when a Vickers indenter is indented. FIG. 3 is a 790X scanning micrograph of the sample wherein 25 wt % of WC was used in place of HfB$_2$ in FIGS. 1 and 2 and sintered under the same sintering condition.

EXAMPLE 2

In the same way as in Example 1, 4 wt % of MgO, 2 wt % of Al$_2$O$_3$ and the boride, carbide or nitride of the element of Group IIIa, IVa, Va or VIa of the Periodic Table were added to Si$_3$N$_4$, and each of the resulting mixtures was molded and sintered in the same way as in Example 1. The properties of the resulting sinters were shown in Table 2. These sinters also had a structure in which particles of the boride, carbide or nitride of the element of Group IIIa, IVa, Va or VIa were dispersed as aggregates in Si$_3$N$_4$, the aspect ratio of the constituent particles of the sinter was from 1 to 20, and each sinter exhibited isotropic mechanical properties.

TABLE 2-1

| No. | additive kind | additive Mp(°C.) | content (vol %) | bending strength (kg/mm$^2$) room temp. | bending strength (kg/mm$^2$) 1100° C. | bending strength (kg/mm$^2$) 1300° C. |
|---|---|---|---|---|---|---|
| 1 | YC | 1950° C. | 2 | 65 | 55 | 42 |
| 2 | " | " | 10 | 55 | 43 | 37 |
| 3 | " | " | 50 | 48 | 35 | 30 |
| 4 | " | " | 90 | 15 | 5 | 3 |
| 5 | VC | 2810° C. | 5 | 60 | 49 | 39 |
| 6 | " | " | 10 | 53 | 41 | 31 |
| 7 | " | " | 50 | 47 | 39 | 30 |
| 8 | NbB$_2$ | 3000° C. | 5 | 60 | 58 | 44 |
| 9 | " | " | 25 | 59 | 53 | 40 |
| 10 | " | " | 70 | 52 | 38 | 17 |

TABLE 2-1-continued

| | additive | | | bending strength (kg/mm²) | | |
|---|---|---|---|---|---|---|
| No. | kind | Mp(°C.) | content (vol %) | room temp. | 1100° C. | 1300° C. |
| 11 | NbN | 2300° C. | 5 | 62 | 49 | 37 |
| 12 | " | " | 10 | 55 | 43 | 33 |
| 13 | " | " | 50 | 50 | 39 | 30 |
| 14 | " | " | 90 | 11 | 2 | — |

TABLE 2-2

| No. | breaking tenacity (MN/m³/²) | bending strength after oxidation (kg/mm²) | |
|---|---|---|---|
| | | 1100° C. after 2000 h | 1300° C. after 2000 h |
| 1 | 5 | 48 | 35 |
| 2 | 15 | 49 | 40 |
| 3 | 15 | 42 | 38 |
| 4 | — | 10 | — |
| 5 | 10 | 52 | 50 |
| 6 | 18 | 48 | 45 |
| 7 | 18 | 45 | 43 |
| 8 | 12 | 58 | 55 |
| 9 | 19 | 59 | 52 |
| 10 | 16 | 49 | 18 |
| 11 | 10 | 49 | 38 |
| 12 | 15 | 42 | 32 |
| 13 | 16 | 39 | 30 |
| 14 | — | — | — |

It can be understood from Tables 2 and 1 that the oxidation resistance could be improved particularly when the boride of the element of Group IIIa, IVa, Va or VIa was used.

EXAMPLE 3

1.0 wt % of B4C having an average particle diameter of 0.5 μm, 3 wt % of a novolak phenol resin and the boride, carbide or nitride of the element of Group IIIa, IVa, Va or VIa of the Periodic Table were added to β-SiC powder having an average particle diameter of 0.3 μm, and each of the resulting mixtures was injection-molded at a pressure of 1,000 kg/cm² and was then sintered at 2,300° C. for 1 hour in an Ar atmosphere to obtain a sample. Separately, 2 wt % of Al having an average particle diameter of 2 μm and the boride, nitride or carbide of the element of Group IIIa, IVa, Va or VIa of the Periodic Table were added to α-SiC powder having an average particle diameter of 1 μm, and each of the mixtures was hot-pressed at 2,050° C. and 200 kg/cm² to obtain a sample. Similarly, $Si_3N_4$ having an average particle diameter of 0.7 μm, $Al_2O_3$ having an average particle diameter of 0.5 μm, AlN having an average particle diameter of 2 μm and $SiO_2$ having an average particle diameter of 1 μm were sampled in such a manner that Z in the general formula $Si_{6-z}Al_zO_zN_{8-z}$ of sialon falls within the range of 0.2 to 4.2. Furthermore, a boride, nitride or carbide of the element of Group IIIa, IVa, Va or VIa of the Periodic Table was added to these mixtures. Each mixture was injection-molded and then sintered at 1,700° C. for 1 hour in $N_2$ gas to obtain a sample. The properties of the samples are shown in Table 3.

TABLE 3-1

| No. | silicon sinter | additive kind | content vol % | bending strength (kg/mm²) | | | breaking tenacity (MN/m³/²) | bending strength after oxidation (kg/mm²) | |
|---|---|---|---|---|---|---|---|---|---|
| | | | | room temp. | 1100° C. | 1300° C. | | 1100° C. after 2000 h | 1300° C. after 2000 h |
| 1 | hot-pressed | YC | 5 | 90 | 90 | 93 | 10 | 90 | 88 |
| 2 | SiC | " | 10 | 88 | 88 | 88 | 15 | 89 | 87 |
| 3 | | " | 50 | 85 | 85 | 80 | 15 | 87 | 75 |
| 4 | | " | 70 | 80 | 70 | 22 | 15 | 30 | 7 |
| 5 | normal | HfC | 10 | 62 | 62 | 61 | 15 | 61 | 60 |
| 6 | pressure | " | 25 | 59 | 57 | 58 | 16 | 59 | 58 |
| 7 | sintered | " | 50 | 57 | 56 | 56 | 15 | 56 | 53 |
| 8 | SiC | VN | 5 | 60 | 62 | 62 | 10 | 60 | 60 |
| 9 | | " | 10 | 60 | 61 | 63 | 15 | 59 | 60 |
| 10 | normal | " | 70 | 55 | 54 | 15 | 15 | 54 | — |
| 11 | pressure | NbB₂ | 15 | 74 | 74 | 73 | 19 | 75 | 73 |
| 12 | sintered SiC | " | 50 | 72 | 71 | 71 | 18 | 75 | 70 |
| 13 | sialon | YC | 10 | 50 | 40 | 30 | 17 | 50 | 50 |
| 14 | | " | 50 | 47 | 40 | 30 | 18 | 48 | 46 |
| 15 | | TiB₂ | 10 | 49 | 42 | 30 | 17 | 49 | 49 |
| 16 | | " | 50 | 43 | 37 | 23 | 17 | 43 | 42 |
| 17 | | VC | 10 | 51 | 41 | 31 | 18 | 51 | 50 |
| 18 | | " | 50 | 45 | 37 | 25 | 19 | 45 | 45 |
| 19 | | VN | 75 | 49 | 40 | 30 | 12 | 49 | 49 |
| 20 | | " | 70 | 39 | 30 | 2 | 15 | 38 | — |
| 21 | | NbB₂ | 5 | 48 | 39 | 30 | 12 | 48 | 47 |
| 22 | | " | 70 | 37 | 30 | 5 | 15 | 37 | — |

In these samples, too, the aspect ratios of the constituent particles were up to 10, and the sinters exhibited substantially an isotropic mechanical strength. Rotors were produced at the blend ratios of Nos. 5 through 9 and 11 through 22 of Table 3 in the same way as in Example 1. When the rotors were continuously operated at a speed of 300,000 rpm at a gas temperature of 1,100° to 1,200° C., no problems such as breakage occured at all.

EXAMPLE 4

0.75 wt % of B4C having an average particle diameter of 0.5 μm, 4 wt % of a novolak phenol resin, 15 wt % of low polymerization polyethylene and the boride, nitride or carbide of the element of Group IIIa, IVa, Va or VIa having an average particle diameter of 1 to 80 μm were added to α-SiC powder having an average particle diameter of 0.5 μm, and each of the resulting mixtures was injection-molded at a pressure of 1,000 kg/cm², was heated at a rate of 2° C./hr to remove the binder and was sintered at 2,300° C. for 1 hour in an Ar atmosphere to obrain a sample. In contrast, 4 wt % of AlN having an average particle diameter of 2 μm and a boride, nitride or carbide of the element of Group IIIa, VIa, Va or VIa were added to α-SiC powder having an average particle diameter of 2 μm, and each of the resulting mixtures was hot-pressed at 2,050° C. and 200 kg/cm² to obtain a sample sinter. The properties of the samples are shown in Table 4.

1,300° to 1,500° C., but no problems such as breakage occurred at all.

The rotor blades and shaft were separately injection-molded, were sintered in the same way, and were joined by hot press at 2,100° C. by packing the same starting powder between them to obtain a sample rotor. The mechanical properties of the joined, sintered rotor obtained by injection-molding and sintering in accordance with this method were substantially isotropic, so that the joint portion had an extremely high reliability, and

TABLE 4

| No. | silicon sinter | additive kind | content vol % | bending strength (kg/mm²) room temp. | 1100° C. | 1500° C. | breaking tenacity (MN/m$^{3/2}$) | bending strength at room temp. (kg/mm²) after oxidation at 1100° C. 2000 h | after oxidation at 1500° C. 2000 h |
|---|---|---|---|---|---|---|---|---|---|
| 1 | normal | HfB$_2$ | 3 | 68 | 68 | 69 | 5 | 68 | 68 |
| 2 | pressure | " | 5 | 70 | 70 | 71 | 10 | 70 | 69 |
| 3 | sintered | " | 10 | 72 | 72 | 75 | 17 | 70 | 70 |
| 4 | SiC | " | 50 | 70 | 71 | 70 | 18 | 72 | 68 |
| 5 |  | " | 70 | 43 | 41 | 20 | 15 | 41 | 5 |
| 6 |  | TaB$_2$ | 5 | 75 | 75 | 76 | 10 | 74 | 74 |
| 7 |  | " | 10 | 73 | 74 | 75 | 18 | 76 | 75 |
| 8 |  | " | 50 | 70 | 71 | 70 | 18 | 71 | 68 |
| 9 |  | VB$_2$ | 5 | 73 | 72 | 73 | 16 | 74 | 70 |
| 10 |  | " | 50 | 71 | 72 | 74 | 17 | 70 | 69 |
| 11 |  | " | 70 | 58 | 55 | 18 | 15 | 53 | 2 |
| 12 |  | VC | 2 | 75 | 77 | 77 | 5 | 77 | 73 |
| 13 |  | " | 10 | 72 | 73 | 73 | 17 | 74 | 68 |
| 14 |  | " | 50 | 70 | 69 | 71 | 18 | 70 | 65 |
| 15 |  | WC | 5 | 60 | 61 | 63 | 10 | 60 | 55 |
| 16 |  | " | 10 | 61 | 63 | 63 | 15 | 63 | 57 |
| 17 |  | " | 50 | 55 | 55 | 54 | 15 | 58 | 50 |
| 18 | hot- | ZrN | 2 | 93 | 93 | 95 | 6 | 92 | 89 |
| 19 | pressed | " | 5 | 90 | 90 | 92 | 10 | 93 | 90 |
| 20 | SiC | " | 10 | 90 | 89 | 81 | 16 | 90 | 90 |
| 21 |  | " | 50 | 85 | 86 | 86 | 16 | 85 | 84 |
| 22 |  | " | 70 | 80 | 79 | 35 | 14 | 82 | 11 |
| 23 |  | NbB$_2$ | 5 | 108 | 110 | 111 | 11 | 105 | 100 |
| 24 |  | " | 10 | 103 | 105 | 105 | 18 | 107 | 101 |
| 25 |  | " | 50 | 100 | 99 | 102 | 19 | 98 | 95 |
| 26 |  | W$_2$B | 5 | 110 | 108 | 108 | 11 | 110 | 102 |
| 27 |  | " | 10 | 109 | 110 | 111 | 17 | 110 | 102 |
| 28 |  | " | 50 | 100 | 98 | 99 | 18 | 99 | 96 |
| 29 |  | " | 70 | 89 | 85 | 23 | 15 | 83 | 4 |

Aa a result of SEM observation of the samples Nos. 3, 4, 7, 13, 16, 20, 25 and 28 among the resulting samples, it was found that SiC was elliptic with the major axis of from 2 to 10 μm and the minor axis of from 1 to 5 μm (aspect ratios of 1~4), and the boride, nitride or carbide were dispersed in SiC primarily as aggregates of particles having particle diameters of 1 to 5 μm. It was also found that the number of particles in the particle aggregate was dependent upon the particle diameter of the starting material; when the starting material had average particle diameter of 1, 5, 15, 50 or 80 μm, the average number of particles were about 1, 5, 100, 1,000 or 5,000, respectively, and the breaking tenacity of the resulting ceramics particularly increased to 15 MN/m$^{3/2}$ or above when the number of particles of the particle aggregate was about 100 or above.

Rotors (a unitary structure of blades and shaft) for a turbo charger having a blade diameter of 40 mm were fabricated using the samples Nos. 3, 4, 7, 13 and 16 in the same way as in Example 1. When a testpiece was cut out of each sample rotor and was examined, the ceramics forming the rotor was found to have isotropic mechanical properties.

Each rotor was continuously operated at a speed of 300,000 rpm for 1,000 hours at a gas temperature of 1,300° to 1,500° C., but no problems such as breakage occurred at all.

the rotor did not undergo at all breakage even after continuous rotation test in a gas of 1,300° to 1,500° C. or after repetition test of gas by turning ON and OFF the gas.

Figure 4:
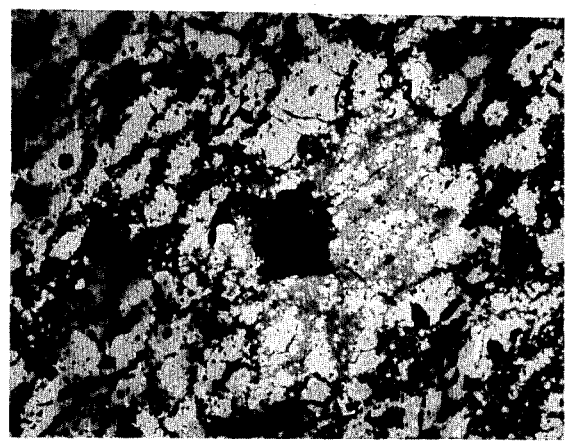
Figure 5:
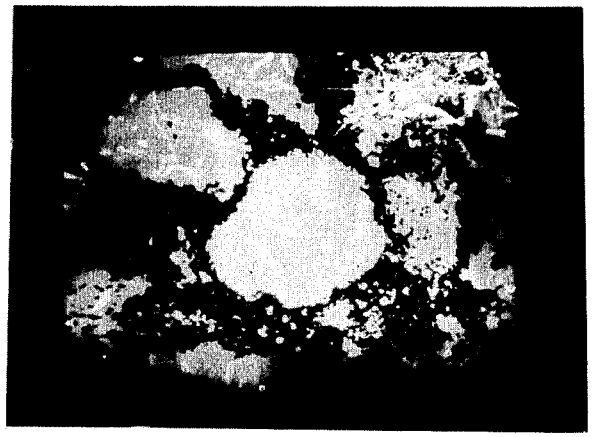

FIG. 4 is a 200X optical micrograph of the ceramics obtained by adding and dispersing 69.2 wt % of NbB$_2$ into 30.8 wt % of a body consisting of 96 wt % of SiC and 4 wt % of AlN, and sintering the mixture at 2,050° C. for 1 hour. The micrograph shows the mode of cracks when a Vickers indenter is indented. FIG. 5 is a 220X scanning micrograph of the ceramics obtained under the same condition as in FIG. 5, and shows that when a Vickers indenter is indented, cracks are branched and absorbed.

EXAMPLE 5

0.75 wt % of B$_4$C having an average particle diameter of 0.5 μm, 4 wt % of a novolak phenol resin, 15 wt % of low-polymerixation polyethylene and niobium nitride having an average particle diameter of 1 to 2 μm were added to β-SiC powder having an average particle diameter of 0.5 μm, and the mixture was injection-molded at a pressure of 1,500 kg/cm², was heated at a rate of 2° C./hr to remove the binder and was sintered at 2,300° C. for 1 hour in an Ar atmosphere to obtain a sample. Separately, 2 wt % of $Al_2O_3$ having an average particle diameter of 2 μm and niobium nitride were added to α-SiC powder having an average particle diameter of 2 μm, and the mixture was hot-pressed at 2,050° C. and 200 kg/cm² for 30 minutes to obtain a sample. Table 5 shows the breaking tenacity $K_{1c}$ and the bending strength, after heat-oxidation in the air, of the samples calculated from the bending strength (measured in accordance with the JIS 4-point bending test method), bending strength σ and the size of the flaw c in accordance with the formula $K_{1c}=\sigma\sqrt{\pi c}$.

As a result of SEM observation of the samples Nos. 3 through 6 and 10 through 13 of the samples, it was found that SiC was elliptic with the major axis of from 7 to 12 μm and the minor axis of from 3 to 5 μm in the case of sintering at normal pressure, was elliptic with the major axis of from 2 to 5 μm and the minor axis of from 2 to 3 μm in the case of hot-pressing, and niobium nitride having a particle diameter of 1 to 2 μm was dispersed either alone or as aggregates in the sinters.

Next, rotors for a turbo charger having a blade diameter of 40 mm were fabricated using the samples Nos. 3 through 6. When the rotors were continuously operated at a speed of 300,000 rpm for 1,000 hours in a gas of 1,300° to 1,500° C., no problems such as breakage were observed at all.

EXAMPLE 6

Niobium nitride having an average particle diameter of 15 μm, and $Al_2O_3$, $Y_2O_3$ and MgO each having an average particle diameter of 0.2 to 2 μm were added to α-SiC having an average particle diameter of 0.5 μm, and each mixture was molded under pressure and was sintered at 1,800° C. for 1 hour in a nitrogen atmosphere. The properties of the obtained samples are shown in Table 6.

It was found that in these samples niobium nitride partly reacted with $Al_2O_3$, $Y_2O_3$ and MgO as the sintering aid to form a mixture of niobium nitride, niobium oxide and niobium silicide each having an average particle diameter of about 2 μm, and the particles of these niobium nitride, oxide and silicide were dispersed as particle aggregates in a silicon nitride sinter having an average particle diameter of about 5 μm. It was also found that the number of particles in the particle aggregate was dependent upon the particle diameter of the starting niobium nitride power and, when experiments were carried out using the starting materials having average particle diameters of 1, 5, 15, 50 and 80 μm, the average numbers of particles were about 1, 5, 100, 1,000 and 5,000, respectively, and the breaking tenacity of the resulting ceramics particularly increased to a least 15 $MN/m^{3/2}$ (when the amount of addition of niobium nitride was 10 vol %) when the number of particles of the particle aggregate was about 100 or above.

TABLE 5

| No. | sintering condition | amount of niobium nitride (vol %) | bending strength (kg/mm²) room temp. | 1200° C. | 1500° C. | breaking tenacity (MN/m^{3/2}) | bending strength at room temp. (kg/mm²) after heat-oxidation at 1200° C. 2000 h | after heat-oxidation at 1500° C. 2000 h |
|---|---|---|---|---|---|---|---|---|
| 1 | normal | 0 | 70 | 72 | 72 | 5 | 70 | 70 |
| 2 | pressure | 3 | 71 | 71 | 73 | 5 | 71 | 70 |
| 3 | sintering | 5 | 70 | 71 | 72 | 10 | 69 | 69 |
| 4 | at | 10 | 65 | 64 | 63 | 15 | 63 | 62 |
| 5 | 2300° C. | 25 | 63 | 61 | 60 | 17 | 60 | 60 |
| 6 | 1 h | 50 | 60 | 58 | 58 | 16 | 55 | 50 |
| 7 |  | 70 | 45 | 43 | 20 | 11 | 40 | 5 |
| 8 | hot- | 0 | 100 | 103 | 105 | 5 | 106 | 105 |
| 9 | pressing | 3 | 98 | 100 | 100 | 5 | 100 | 100 |
| 10 | at | 5 | 98 | 98 | 99 | 11 | 100 | 95 |
| 11 | 2050° C. | 10 | 95 | 95 | 93 | 16 | 93 | 90 |
| 12 | 0.5 h | 25 | 90 | 85 | 85 | 17 | 90 | 85 |
| 13 |  | 50 | 85 | 83 | 80 | 17 | 85 | 80 |
| 14 |  | 70 | 77 | 75 | 31 | 12 | 53 | 18 |

TABLE 6

| No. | amount of niobium nitride (vol %) | $Al_2O_3$ amount of (wt %) | $Y_2O_3$ amount of (wt %) | MgO amount of (wt %) | bending strength (kg/mm²) room temp. | 1200° C. | breaking tenacity (MN/m^{3/2}) | 1100° C. 2000 h bending strength after oxidation (at RT) (kg/mm²) |
|---|---|---|---|---|---|---|---|---|
| 1 | 1 | 3 | 5 | 0 | 80 | 55 | 6 | 65 |
| 2 | 3 | " | " | " | 81 | 53 | 7 | 63 |
| 3 | 5 | " | " | " | 78 | 51 | 11 | 60 |
| 4 | 10 | " | " | " | 79 | 50 | 17 | 60 |
| 5 | 25 | " | " | " | 73 | 50 | 18 | 61 |
| 6 | 50 | " | " | " | 68 | 45 | 15 | 52 |
| 7 | 70 | " | " | " | 63 | 11 | 8 | 17 |
| 8 | 1 | 5 | 0 | 3 | 81 | 45 | 6 | 61 |
| 9 | 3 | " | " | " | 82 | 46 | 6 | 62 |
| 10 | 5 | " | " | " | 75 | 44 | 10 | 60 |
| 11 | 10 | " | " | " | 76 | 40 | 16 | 59 |
| 12 | 25 | " | " | " | 72 | 38 | 18 | 60 |
| 13 | 50 | " | " | " | 66 | 31 | 15 | 48 |
| 14 | 70 | " | " | " | 62 | 5 | 10 | 9 |

TABLE 6-continued

| No. | amount of niobium nitride (vol %) | Al$_2$O$_3$ amount (wt %) | Y$_2$O$_3$ amount (wt %) | MgO amount (wt %) | bending strength (kg/mm$^2$) room temp. | 1200° C. | breaking tenacity (MN/m$^{3/2}$) | 1100° C. 2000 h bending strength after oxidation (at RT) (kg/mm$^2$) |
|---|---|---|---|---|---|---|---|---|
| 15 | 25 | 0.1 | 3 | 0 | 15 | — | — | — |
| 16 | " | 0.5 | " | " | 42 | 31 | 15 | 32 |
| 17 | " | 10 | " | " | 63 | 40 | 15 | 42 |
| 18 | " | 20 | " | " | 45 | 7 | 6 | 18 |
| 19 | " | 5 | 0.1 | " | 12 | — | — | — |
| 20 | " | " | 0.5 | " | 45 | 33 | 15 | 30 |
| 21 | " | " | 10 | " | 68 | 43 | 16 | 43 |
| 22 | " | " | 20 | " | 51 | 9 | 7 | 11 |
| 23 | " | 3 | 0 | 0.1 | 17 | — | — | — |
| 24 | " | " | " | 0.5 | 48 | 31 | 15 | 30 |
| 25 | " | " | " | 10 | 55 | 32 | 15 | 35 |
| 26 | " | " | " | 20 | 50 | 5 | 8 | 17 |
| 27 | " | " | 5 | 2 | 78 | 53 | 18 | 39 |

EXAMPLE 7

Al$_2$O$_3$ having an average particle diameter of 0.5 μm, AlN having an average particle diameter of 2 μm and SiO$_2$ having an average particle diameter of 1 μm were weighed and added to Si$_3$N$_4$ powder having an average particle diameter of 0.7 μm in such a manner that Z in the general formula of sialon Si$_{6-z}$Al$_z$O$_z$N$_{8-z}$ falled within the range of 0.2 to 4.2, and 3 to 70 vol % of niobium nitride was further added. After being mixed uniformly, the mixture was die-molded at a pressure of 1,000 kg/cm$^2$. The molded article was sintered at 1,700° C. for 1 hour in nitrogen gas. In this example, a void ratio was below 5% and bending strength was at least 40 kg/cm$^2$ within the range of Z of 0.5 to 4.0 in the resulting sinter, and its breaking tenacity was at least 10 MN/m$^{3/2}$ when the amount of addition of niobium nitride was within the range of 5 to 50 vol %.

EXAMPLE 8

0.75 wt % of B$_4$C having an average particle diameter of 0.5 μm, 4 wt % of a novolak phenol resin, 15 wt % of low-polymerization polyethylene and borides of the element of Group Va and IVa (i.e. V, Nb, Ta, Cr, Mo, or W) of the Periodic Table were added to β-SiC powder having an average particle diameter of 0.5 μm. Each of the resulting mixtures was injection-molded at a pressure of 1,500 kg/cm$^2$, was heated at a rate of 2° C./hr to remove the binder and was sintered at 2,300° C. for 1 hour in an Ar atmosphere to obtain a sample. Seperately, 2 wt % of Al$_2$O$_3$ having an average particle diameter of 2 μm and borides of the element of Group Va and VIa of the Periodic Table were added to α-SiC powder having an average particle diameter of 2 μm, and each of the mixtures was hot-pressed at 2,100° C. and 200 kg/cm$^2$ for 30 minutes to obtain a sample. The breaking tenacity K$_{1c}$ and bending strength after heat-oxidation in air, of the obtained samples, as calculated from the bending strength (measured by the JIS 4-point bending method), bending strength σ and the size of the flaw in accordance with the formula K$_{1c}=\sigma\sqrt{\pi c}$ were shown in Table 7.

TABLE 7

| No. | sintering condition | additive kind | additive amount vol % | bending strength (kg/mm$^2$) room temp. | 1200° C. | 1500° C. | breaking tenacity (MN/m$^{3/2}$) | bending strength at room temp. (kg/mm$^2$) after oxidation at 1200° C. 2000 h | after oxidation at 1500° C. 2000 h |
|---|---|---|---|---|---|---|---|---|---|
| 1 | normal | VB$_2$ | 3 | 78 | 76 | 77 | 6 | 77 | 76 |
| 2 | pressure | " | 5 | 78 | 79 | 79 | 10 | 78 | 78 |
| 3 | sintering | " | 10 | 76 | 75 | 74 | 16 | 76 | 74 |
| 4 | 2300° C. | " | 25 | 75 | 74 | 73 | 17 | 75 | 73 |
| 5 | 1 h | " | 50 | 75 | 75 | 74 | 17 | 74 | 74 |
| 6 | | " | 70 | 52 | 51 | 33 | 10 | 52 | 17 |
| 7 | | NbB$_2$ | 3 | 79 | 79 | 78 | 5 | 79 | 80 |
| 8 | | " | 5 | 79 | 78 | 78 | 12 | 79 | 78 |
| 9 | | " | 10 | 77 | 78 | 79 | 18 | 77 | 76 |
| 10 | | " | 25 | 78 | 79 | 79 | 19 | 78 | 76 |
| 11 | | " | 50 | 74 | 75 | 74 | 18 | 75 | 75 |
| 12 | | " | 70 | 53 | 53 | 38 | 11 | 53 | 19 |
| 13 | | TaB$_2$ | 3 | 77 | 78 | 78 | 5 | 77 | 77 |
| 14 | | " | 5 | 75 | 76 | 77 | 10 | 74 | 76 |
| 15 | | " | 10 | 77 | 77 | 76 | 16 | 75 | 73 |
| 16 | | " | 50 | 76 | 76 | 77 | 15 | 75 | 71 |
| 17 | | " | 70 | 50 | 51 | 29 | 10 | 50 | 11 |
| 18 | hot | NbB$_2$ | 3 | 113 | 113 | 115 | 5 | 115 | 110 |
| 19 | pressing | " | 5 | 110 | 112 | 110 | 12 | 111 | 112 |
| 20 | at | " | 10 | 109 | 110 | 110 | 19 | 108 | 108 |
| 21 | 2050 ~ | " | 50 | 103 | 103 | 100 | 19 | 104 | 100 |
| 22 | 2100° C. | " | 70 | 81 | 82 | 53 | 10 | 80 | 25 |
| 23 | 30 min. | CrB$_2$ | 5 | 105 | 105 | 105 | 10 | 105 | 100 |
| 24 | | " | 10 | 109 | 109 | 100 | 17 | 110 | 102 |
| 25 | | " | 50 | 100 | 100 | 98 | 16 | 102 | 99 |

TABLE 7-continued

| No. | sintering condition | additive kind | additive amount vol % | bending strength (kg/mm²) room temp. | bending strength (kg/mm²) 1200° C. | bending strength (kg/mm²) 1500° C. | breaking tenacity (MN/m^{3/2}) | bending strength at room temp. (kg/mm²) after oxidation at 1200° C. 2000 h | bending strength at room temp. (kg/mm²) after oxidation at 1500° C. 2000 h |
|---|---|---|---|---|---|---|---|---|---|
| 26 |  | " | 70 | 77 | 78 | 39 | 10 | 79 | 17 |
| 27 |  | MoB$_2$ | 3 | 111 | 108 | 109 | 5 | 110 | 103 |
| 28 |  | " | 5 | 109 | 110 | 109 | 11 | 112 | 99 |
| 29 |  | " | 10 | 103 | 104 | 100 | 16 | 105 | 98 |
| 30 |  | " | 50 | 99 | 100 | 98 | 16 | 99 | 95 |
| 31 |  | W$_2$B | 5 | 110 | 110 | 105 | 10 | 109 | 100 |
| 32 |  | " | 10 | 105 | 108 | 107 | 15 | 110 | 101 |
| 33 |  | " | 50 | 100 | 100 | 97 | 15 | 103 | 97 |

As a result of SEM observation of the obtained samples, it was found that SiC was elliptic with the major axis ranging from 7 to 12 μm and the minor axis of 3 to 5 μm in the case of sintering at normal pressure and with the major axis ranging from 2 to 5 μm and the minor axis of 2 to 3 μm in the case of hot pressing, and the boride of the element of Group Va or VIa, having an average particle diameter of 1 to 2 μm was dispersed either alone or as aggregates in the sinter.

Rotors for a turbo charger having a blade diameter of 40 mm were fabricated using the samples Nos. 3, 4, 9 and 10. After the rotors were continuously operated at a speed of 300,000 rpm for 1,000 hours in a gas of 1,300° to 1,500° C. or subjected to start-stop repetition tests 100 times by turning ON and OFF the gas, no problems such as breakage were observed at all.

EXAMPLE 9

Borides of the elements of Groups Va and VIa of the Periodic Table having an average particle diameter of about 15 μm, 3 wt % of Aμ$_2$O$_3$ having an average particle diameter of 0.5 μm and 5 wt % of Y$_2$O$_3$ having an average particle diameter of 1 μm were mixed with α-Si$_3$N$_4$ powder having an average particle diameter of 0.5 μm, and each of the resulting mixtures was pressure-molded and was sintered at 1,800° C. for 1 hour in a nitrogen atmosphere. The properties of the obtained samples were shown in Table 8.

It was found that, in these samples, the borides of the elements of Groups Va and VIa partly reacted with Al$_2$O$_3$, Y$_2$O$_3$ or with Si$_3$N$_4$ to form mixed particles of the borides, nitrides, silicides and oxides of the elements of Groups Va and VIa, and these particles were dispersed as particle aggregates in the Si$_3$N$_4$ sinter having an average particle diameter of about 5 μm. It was also found that the number of particles in the particle aggregate was dependent upon the particle diameter of the starting boride particles of Groups Va and VIa, when the starting material having an average particle diameter of 1, 5, 15, 50 or 80 μm was used, the average number of particles were about 1, 5, 100, 1,000 and 5,000, respectively, and the breaking tenacity of the resulting ceramics particularly increased to at least 15 MN/m$^{3/2}$ when the number of particles of the particle aggregate was at least about 100.

TABLE 8

| No. | additive kind | additive amount (vol %) | bending strength room temp. | bending strength 1200° C. | breaking tenacity (MN/m^{3/2}) | bending strength after oxidation at 1,100° C., 2,000 hr (at RT) (kg/mm²) |
|---|---|---|---|---|---|---|
| 1 | VB$_2$ | 3 | 83 | 57 | 6 | 70 |
| 2 | " | 5 | 85 | 60 | 11 | 72 |
| 3 | " | 10 | 82 | 59 | 18 | 70 |
| 4 | " | 25 | 81 | 59 | 19 | 71 |
| 5 | " | 50 | 82 | 60 | 19 | 70 |
| 6 | " | 70 | 68 | 21 | 10 | 23 |
| 7 | NbB$_2$ | 3 | 83 | 58 | 6 | 73 |
| 8 | " | 5 | 88 | 62 | 13 | 77 |
| 9 | " | 10 | 86 | 61 | 19 | 75 |
| 10 | " | 25 | 85 | 60 | 20 | 72 |
| 11 | " | 50 | 82 | 58 | 20 | 72 |
| 12 | " | 70 | 65 | 22 | 12 | 19 |
| 13 | TaB$_2$ | 5 | 79 | 53 | 10 | 60 |
| 14 | " | 10 | 77 | 49 | 15 | 53 |
| 15 | " | 50 | 78 | 45 | 15 | 49 |
| 16 | CrB$_2$ | 5 | 81 | 61 | 11 | 60 |
| 17 | " | 10 | 80 | 62 | 16 | 60 |
| 18 | " | 50 | 77 | 59 | 15 | 57 |
| 19 | MoB$_2$ | 3 | 85 | 63 | 6 | 72 |
| 20 | " | 5 | 85 | 65 | 11 | 70 |
| 21 | " | 10 | 81 | 60 | 16 | 65 |
| 22 | " | 50 | 79 | 60 | 16 | 62 |
| 23 | " | 70 | 58 | 41 | 10 | 12 |
| 24 | W$_2$B | 3 | 88 | 62 | 6 | 73 |
| 25 | " | 5 | 85 | 63 | 10 | 70 |
| 26 | " | 10 | 81 | 58 | 15 | 63 |
| 27 | " | 50 | 77 | 60 | 16 | 61 |

When the experiments were carried out by changing the amounts of $Al_2O_3$ and $Y_2O_3$ as the sintering aid, large quantities of voids occurred in the sinters, the strength reached below 30 kg/mm$^2$ and the oxidation resistance dropped, when the amounts of $Al_2O_3$ and $Y_2O_3$ were below 0.5 wt %, respectively. When the amounts of $Al_2O_3$ and $Y_2O_3$ were above 10 wt %, respectively, the high-temperature strength of the sinters dropped and the bending strength at 1,200° C. was found to be below 30 kg/mm$^2$.

EXAMPLE 10

5 wt % of $Y_2O_3$ and 3 wt % of MgO were added to $Si_3N_4$ and, after 25 vol % of $NB_2$ was further added, the mixture was blended, molded and sintered in the same way as in Example 9. The resulting sinter exhibited a bending strength at room temperature of 80 kg/mm$^2$, breaking tenacity of 18 MN/m$^{3/2}$ and bending strength at 1,200° C. of 55 kg/mm$^2$. When the experiments were carried out while changing the amount of addition of MgO, it was found that the bending strength at room temperature dropped below 30 kg/mm$^2$ when the amount of MgO was below 0.5 wt %, and the bending strength at 1,200° C. dropped below 30 kg/mm$^2$ when the amount of MgO was above 10 wt %.

EXAMPLE 11

$Al_2O_3$ having an average particle diameter of 0.5 μm, AlN having an average particle diameter of 2 μm and $SiO_2$ having an average particle diameter of 1 μm were weighed and added to $Si_3N_4$ powder having an average particle diameter of 0.7 μm in such a manner that Z in the general formula of sialon $Si_{6-z}Al_zO_zN_{8-z}$ falled within the range of 0.5 to 4.0 $VB_2$, $NbB_2$ or $WB_2$ was further added to the mixture, and each of the resulting mixtures was die-molded at a pressure of 1,000 kg/cm$^2$, and the resulting molded article was sintered at 1,700° C. for 1 hour in nitrogen gas. The properties of the obtained samples were shown in Table 9.

TABLE 9

| No. | Z | additive kind | amount (vol %) | bending strength (kg/mm$^2$) room temp. | bending strength (kg/mm$^2$) 1100° C. | breaking tenacity (MN/m$^{3/2}$) |
|---|---|---|---|---|---|---|
| 1 | 0.5 | VB$_2$ | 3 | 81 | 66 | 5 |
| 2 | | | 5 | 80 | 66 | 10 |
| 3 | | | 10 | 69 | 60 | 15 |
| 4 | | | 50 | 61 | 49 | 15 |
| 5 | | | 70 | 53 | 28 | 11 |
| 6 | | NbB$_2$ | 3 | 81 | 65 | 6 |
| 7 | | | 5 | 82 | 67 | 11 |
| 8 | | | 10 | 80 | 60 | 16 |
| 9 | | | 50 | 75 | 55 | 16 |
| 10 | | W$_2$B | 5 | 79 | 63 | 5 |
| 11 | | | 10 | 77 | 60 | 10 |
| 12 | | | 50 | 65 | 50 | 16 |
| 13 | | | 70 | 49 | 21 | 9 |
| 14 | 2.0 | VB$_2$ | 5 | 67 | 51 | 10 |
| 15 | | | 10 | 65 | 48 | 15 |
| 16 | | | 50 | 51 | 38 | 15 |
| 17 | | | 70 | 32 | 11 | 8 |
| 18 | | NbB$_2$ | 3 | 70 | 55 | 6 |
| 19 | | | 5 | 70 | 57 | 11 |
| 20 | | | 10 | 65 | 53 | 16 |
| 21 | | | 50 | 51 | 43 | 16 |
| 22 | | | 70 | 40 | 25 | 10 |
| 23 | | W$_2$B | 3 | 61 | 43 | 5 |
| 24 | | | 5 | 60 | 41 | 10 |
| 25 | | | 10 | 51 | 38 | 15 |
| 26 | | | 50 | 46 | 32 | 15 |
| 27 | | VB$_2$ | 3 | 55 | 40 | 5 |
| 28 | | | 5 | 51 | 38 | 10 |
| 29 | | | 10 | 48 | 35 | 15 |
| 30 | | | 50 | 46 | 30 | 15 |
| 31 | | NbB$_2$ | 5 | 61 | 49 | 10 |
| 32 | | | 10 | 59 | 45 | 16 |
| 33 | | | 50 | 55 | 40 | 17 |
| 34 | | | 70 | 42 | 26 | 10 |
| 35 | 4.0 | W$_2$B | 3 | 57 | 40 | 5 |
| 36 | | | 5 | 57 | 41 | 10 |
| 37 | | | 10 | 43 | 35 | 15 |
| 38 | | | 50 | 41 | 30 | 15 |
| 39 | | | 70 | 32 | 13 | 0 |

What is claimed is:

1. A composite sintered ceramic structure having a high thermal shock resistance which comprises a first fine particle component consisting essentially of at least one member selected from the group consisting of $Si_3N_4$ and sialon and forming a matrix for the composite sintered ceramic structure and a second fine particle component consisting essentially of at least one member selected from the group consisting of YC, $TiB_2$, $HfB_2VB_2$, VN, VC, $NbB_2$, NbN, $TaB_2$, $CrB_2$, $MoB_2$ and $W_2B$ and forming aggregates of particles which are more brittle than said first fine particle component and dispersed throughout the matrix whereby cracks developed in the composite sintered ceramic structure are incorporated into the aggregates and are bent or branched therethrough.

2. A composite sintered ceramic structure having a high thermal shock resistance according to claim 1, wherein the amount of said second fine particle component before sintering is between 5 volume % and 70 volume % of the total volume of said first and second fine particle components.

3. A composite sintered ceramic structure having a high thermal shock resistance according to claim 1, wherein the size of said second fine particle component is selected so that the formed aggregates of particles contain more than one hundred particles.

4. A composite sintered ceramic structure having a high thermal shock resistance according to claim 1, wherein the aspect ratios of both of said first and second fine particle components are below 10.

5. A composite sintered ceramic structure having a high thermal shock resistance according to claim 1, further comprised of at least one sintering aid selected from the group consisting of $Al_2O_3$, MgO, $Y_2O_3$ and $B_4C$, the amount of said sintering aid before sintering being not more than 10 weight % of the total weight of said first and second fine particle components and said sintering aid.

6. A composite sintered ceramic structure having a high thermal shock resistance according to claim 1, wherein said structure, when exposed to a heat cycle having the highest service temperature of at least 1,100° C., exhibits a bending strength of at least 30 kg/mm$^2$ and a breaking tenacity of at least 10 MN/m$^{3/2}$ in terms of $K_{1c}$ at the highest service temperature.

7. A composite sintered ceramic structure having a high thermal shock resistance according to claim 1, wherein the amount of said second fine particle component before sintering is between 10 volume % and 50 volume % of the total volume of said first and second fine particle components.

* * * * *

UNITED STATES PATENT AND TRADEMARK OFFICE
CERTIFICATE OF CORRECTION

PATENT NO. : 4,705,761

DATED : November 10, 1987

INVENTOR(S) : Tetsuo Kosugi

It is certified that error appears in the above-identified patent and that said Letters Patent is hereby corrected as shown below:

On the Title Page, in the heading under "United States Patent [19]" delete "Kosugi" and substitute therefor -- Miyoshi et al.--

On the Title Page, delete "[75] Inventor: Tetsuo Kosugi, Toukai, Japan" and substitute therefor the following:

-- [75] Inventors: Tadahiko Miyoshi, Hitachi; Yukio Takeda, Hitachi; Mitsuo Taguchi, Iwaki; and Tetsuo Kosugi, Toukai, all of Japan --

Signed and Sealed this

Fourth Day of October, 1988

Attest:

DONALD J. QUIGG

Attesting Officer

Commissioner of Patents and Trademarks